(12) United States Patent
Meyer et al.

(10) Patent No.: US 6,527,008 B2
(45) Date of Patent: Mar. 4, 2003

(54) VENTILATION DEVICE FOR A FUEL TANK

(75) Inventors: Knut Meyer, Essen (DE); Stefan Fühling, Dortmund (DE); Thomas Zapp, Dortmund (DE); Markus Distelhoff, Frankfurt (DE)

(73) Assignee: Mannesmann VDO AG, Frankfurt am Main (DE)

( * ) Notice: Subject to any disclaimer, the term of this patent is extended or adjusted under 35 U.S.C. 154(b) by 117 days.

(21) Appl. No.: 09/802,385

(22) Filed: Mar. 9, 2001

(65) Prior Publication Data

US 2001/0035168 A1 Nov. 1, 2001

(30) Foreign Application Priority Data

Mar. 10, 2000 (DE) .......................................... 100 11 130

(51) Int. Cl.$^7$ ............................................. B60K 15/035
(52) U.S. Cl. ........................................ 137/587; 220/746
(58) Field of Search ......................... 137/587; 220/746, 220/86.2; 123/514, 518

(56) References Cited

U.S. PATENT DOCUMENTS

| | | | | |
|---|---|---|---|---|
| 3,666,139 A | * | 5/1972 | Urban ......................... | 220/746 |
| 3,749,124 A | * | 7/1973 | Andres ........................ | 137/587 |
| 3,817,421 A | * | 6/1974 | Andres ........................ | 220/746 |
| 4,166,550 A | * | 9/1979 | Kleinschmit et al. ....... | 220/746 |
| 4,423,746 A | * | 1/1984 | Scheurenbrand et al. ... | 137/587 X |
| 4,444,333 A | * | 4/1984 | Anhegger .................... | 220/746 |
| 4,531,653 A | * | 7/1985 | Sakata ........................ | 220/746 |
| 4,836,402 A | * | 6/1989 | Sasaki ........................ | 220/746 |
| 4,919,103 A | | 4/1990 | Ishiguro | |
| 5,408,977 A | | 4/1995 | Cotton | |
| 6,276,387 B1 | * | 8/2001 | Pachciarz et al. ......... | 137/587 X |

FOREIGN PATENT DOCUMENTS

| | | |
|---|---|---|
| DE | 2022996 | 12/1971 |
| DE | 2046562 | 3/1972 |
| DE | 2456726 | 8/1976 |
| DE | 2912214 CZ | 10/1980 |
| DE | 3121621 CZ | 12/1982 |
| DE | 4311470 A1 | 10/1994 |
| EP | 0943476 A1 | 9/1999 |

* cited by examiner

Primary Examiner—John Rivell
(74) Attorney, Agent, or Firm—Mayer, Brown, Rowe & Maw

(57) ABSTRACT

The invention relates to a ventilation device for fuel tanks, wherein the ventilation device comprises a compensator reservoir arranged in the interior of the fuel tank and at least two ventilation lines. The ventilation lines run from below the upper tank wall to the compensator reservoir and extend in the latter toward an opposite tank wall. The apparatus according to the invention is particularly well suited under all static and dynamic stresses for ventilating fuel tanks.

19 Claims, 2 Drawing Sheets

VENTILATION DEVICE FOR A FUEL TANK

FIELD OF THE INVENTION

The invention relates to a ventilation device for a fuel tank of a motor vehicle, wherein the ventilation device comprises a compensator reservoir and at least two ventilation lines opening into the latter.

BACKGROUND OF THE INVENTION

A ventilation device is used to remove the gases displaced by fuel entering a fuel tank during "tanking up" and the gases that are emitted from the fuel during the operation of a motor vehicle. For this purpose, one or more lines are situated below the upper fuel tank wall. These lines lead from the sides of the tank to a common location at which they pass through the tank wall and lead to another tank.

A ventilation device may have two ventilation lines and three compensator reservoirs is known. The ventilation lines open out on both sides of the tank. From there, they lead to the opposite side of the tank and curve back again into the center where they open into a central compensator reservoir. In the curved sections near the side walls the lines include a widened section which is likewise designed as a compensator reservoir. This line routing has the effect that when the tank is inclined ventilation is ensured. One disadvantage is that this device is only suitable for tanks of relatively simple construction. Another disadvantage is that the routing of the ventilation lines is very complicated because of the labyrinth-like course the lines must take. Further disadvantages, caused by the inclusion and arrangement of a number of compensator reservoirs, include that the device is complicated to manufacture and that the installation of the device in a fuel tank requires a high outlay.

SUMMARY OF THE INVENTION

The invention provides a ventilation device which is of simple construction, can be installed easily and ensures reliable ventilation and maximum filling of the fuel tank under all circumstances.

The ventilation device may be used in a fuel tank. In one embodiment it comprises a compensator reservoir in the fuel tank and at least two ventilation lines opening into the compensator reservoir. In this ventilation device, the ventilation lines run from the vicinity of at least one of the side walls of the fuel tank to the compensator reservoir. Advantageous refinements are also disclosed herein.

The ventilation device includes a compensator reservoir which is arranged in the interior of a fuel tank and into which at least two ventilation lines open. The fuel tank includes a first side wall and a second side wall. The compensator reservoir extends from the first side wall to the second side wall of the fuel tank. The ventilation lines include a first opening and a second opening. The ventilation lines are arranged such that at least one of the first openings of the ventilation lines is always situated above the fuel level for all possible inclined positions of the fuel tank. The ventilation lines extend from the vicinity of one of the side walls to the vicinity of the other side wall, wherein the first opening is in the fuel tank and the second opening is within the compensator reservoir.

The ventilation device, therefore, enables reliable ventilation for static and dynamic stressing of the fuel tank and at the same time permits a particularly high filling quantity in the fuel tank. Moreover, the geometrical configuration of the compensator reservoir makes simple routing of the ventilation lines possible, with the result that complicated return lines are superfluous. At the same time, only one compensator reservoir is necessary. Because of its simplicity, the entire ventilation device is distinguished by low production costs, low weight and simple installation.

The compensator reservoir advantageously has a widened section which is used as a liquid trap and via which any fuel which has passed into the compensator reservoir is sucked into the interior of the fuel tank, preferably via an ejector or directly via the fuel pump. To ensure that the ejector or fuel pump does not allow the compensator reservoir to be filled to overflowing when, for example, the vehicle is parked on a slope, a nonreturn valve is used in the extraction line of the widened section.

The ventilation device is particularly simple if the ventilation lines enter into the compensator reservoir at any desired location, preferably at the widened section, and are then guided in the compensator reservoir until they are close to the side wall opposite the side wall in the vicinity of the first opening of the ventilation line. When the ventilation lines are arranged diagonally, the above-described system ensures satisfactory ventilation of the fuel tank at maximum filling level and due to the static and dynamic stresses, optimally prevents the fuel tank from being filled to overflowing.

Depending on the shape of the tank, the diagonal ventilation arrangement can also be formed using four predominantly diagonal ventilation lines while retaining the abovementioned, positive properties. In this case, the ventilation lines are arranged starting in the corners of the fuel tank and running diagonally toward the compensator reservoir. The compensator reservoir may be arranged in any desired manner with respect to the longitudinal axis of the vehicle and may also be of x-shaped design with the individual arms of the compensator reservoir extending toward the ventilation lines.

It is furthermore advantageous if the compensator reservoir has a float/roll-over valve.

The invention is explained in greater detail using three exemplary embodiment and the associated Figures.

DETAILED DESCRIPTION OF THE PREFERRED EMBODIMENT

Figure 1:
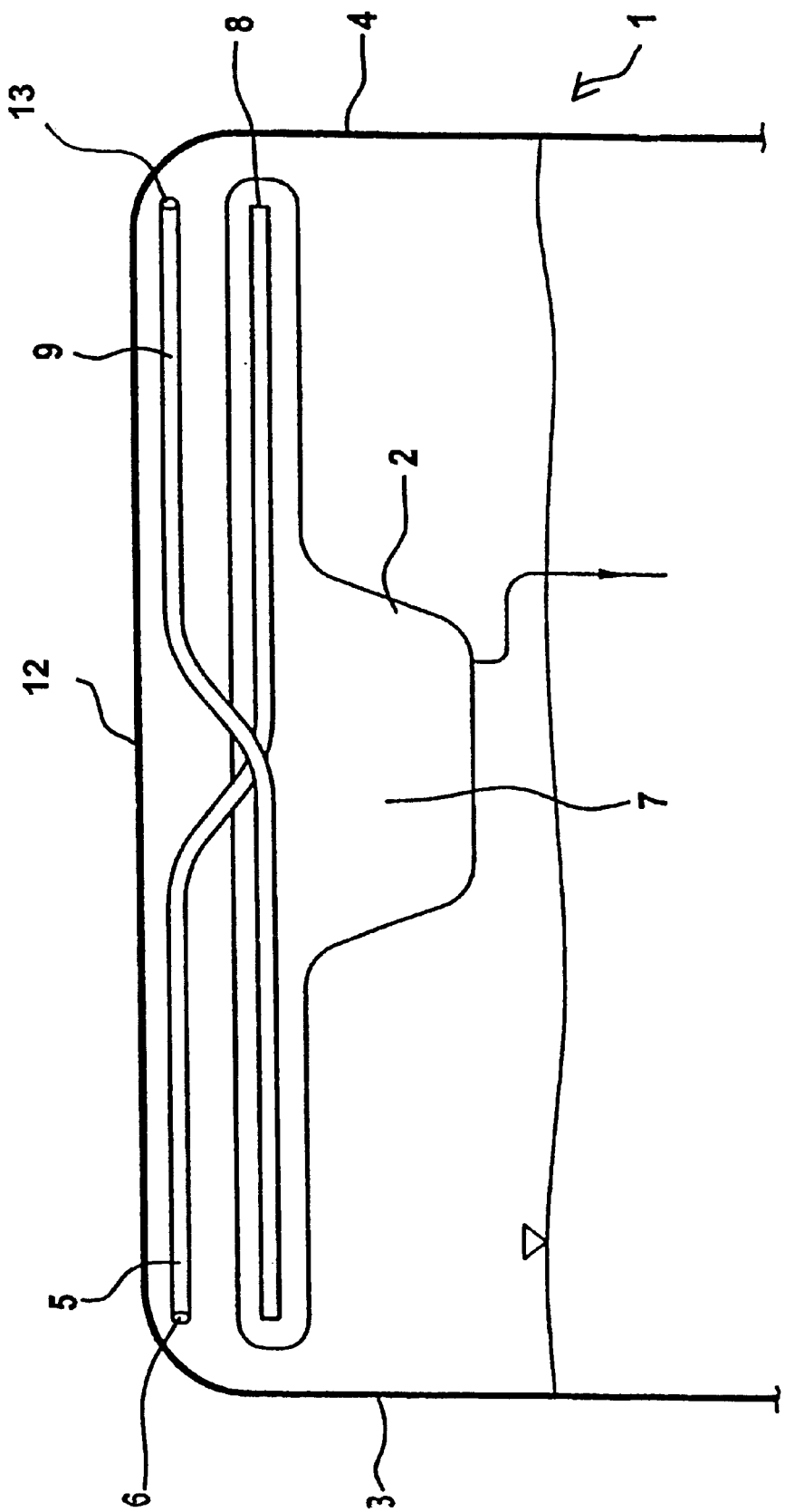
FIG. 1 shows a cross-sectional view of an embodiment of a ventilation in a fuel tank.

The fuel tank 1, as shown in FIG. 1, has a compensator reservoir 2 right below the upper fuel tank wall 12. The compensator reservoir 2 extends essentially from a first side wall 3 to a second side wall 4 which is located opposite the first side wall 3. A first ventilation line 5 opens into the interior of the fuel tank 1 with a first opening 6 close to the first side wall 3. This first ventilation line 5 enters into a widened section 7 of the compensator reservoir 2 and runs within the compensator reservoir 2 until it nears the vicinity of the second side wall 4, wherein the ventilation line 5 opens with a second opening 8 into the compensator reservoir 2. A second ventilation line 9 opens into the interior of the fuel tank 1 with a first opening 13 close to the second side wall 4. This second ventilation line 9 enters into the widened section 7 of the compensator reservoir 2 and continues within the interior of the compensator reservoir 2 until it nears the vicinity of the first side wall 3.

Figure 2:
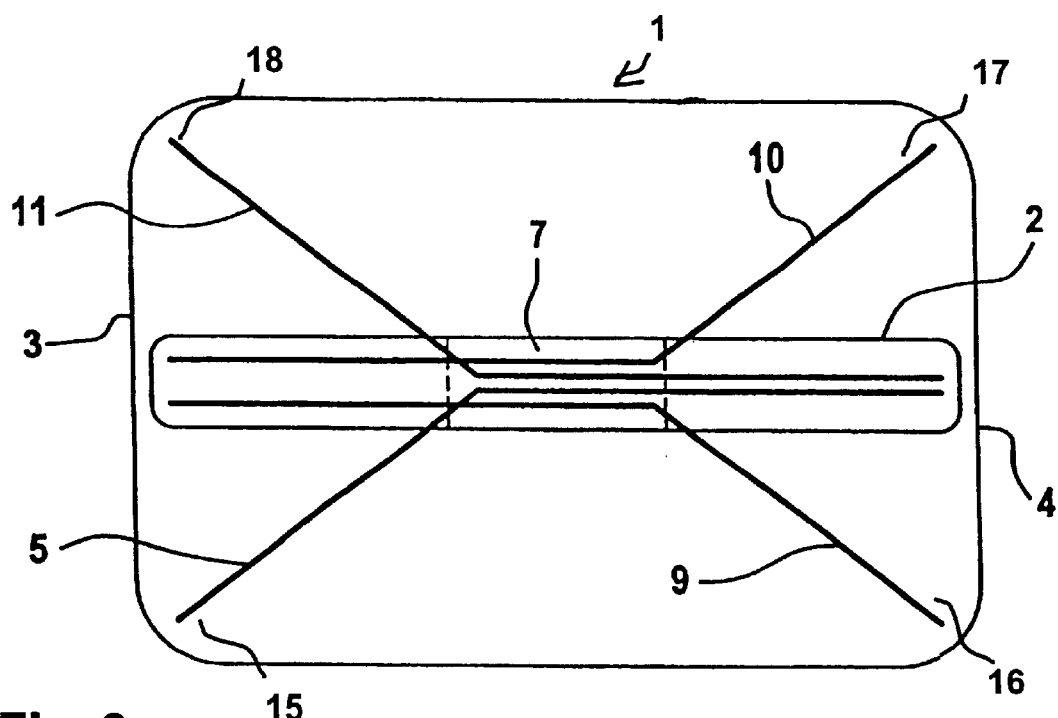
FIG. 2 shows the plan view of an embodiment of a ventilation device.

FIG. 2 illustrates an embodiment of the ventilation device using four ventilation lines. The fuel tank includes four areas from which each of the four ventilation lines originate. The first, second, third and fourth ventilation lines, (5, 9, 10 and 11, respectively) are arranged near one another in the compensator reservoir 2. The first, second, third and fourth ventilation lines 5, 9, 10, and 11, respectively, are predominantly diagonal and run diagonally from the first area 15, second area 16, third area 17 and fourth area 18, respectively, toward the compensator reservoir 2 and then enter into the compensator reservoir 2 in the region of the widened section 7. Once the first, second, third and fourth ventilation lines 5, 9, 10, and 11, respectively, enter into the compensator reservoir 2, they are parallel to each other and are guided to either the first side wall or the second side wall, whichever is located further from the area from which that particular ventilation line originated (the "opposing side wall"). For example, in the embodiment shown in FIG. 2, the first ventilation line 5 originates in area 15 and runs diagonally towards the widened section 7 of the compensator reservoir 2. Once the first ventilation line 5 enters the compensator reservoir 2 at the widened section 7, it travels toward the second side wall 4 and ends within the compensator reservoir 2. The second ventilation line 9 originates in area 16 and runs diagonally towards the widened section 7 of the compensator reservoir 2. Once the second ventilation line 9 enters the compensation reservoir 2 at the widened section 7, it travels toward the first side wall 3 and ends within the compensator reservoir 2. The third ventilation line 10 originates in area 17 and runs diagonally towards the widened section 7 of the compensator reservoir 2. Once the third ventilation line 10 enters the compensation reservoir 2 at the widened section 7, it travels toward the first side wall 3 and ends within the compensator reservoir 2. The fourth ventilation line 11 originates in area 18 and runs diagonally towards the widened section 7 of the compensator reservoir 2. Once the fourth ventilation line 11 enters the compensation reservoir 2 at the widened section 7, it travels toward the second side wall 4 and ends within the compensator reservoir 2.

Figure 3:
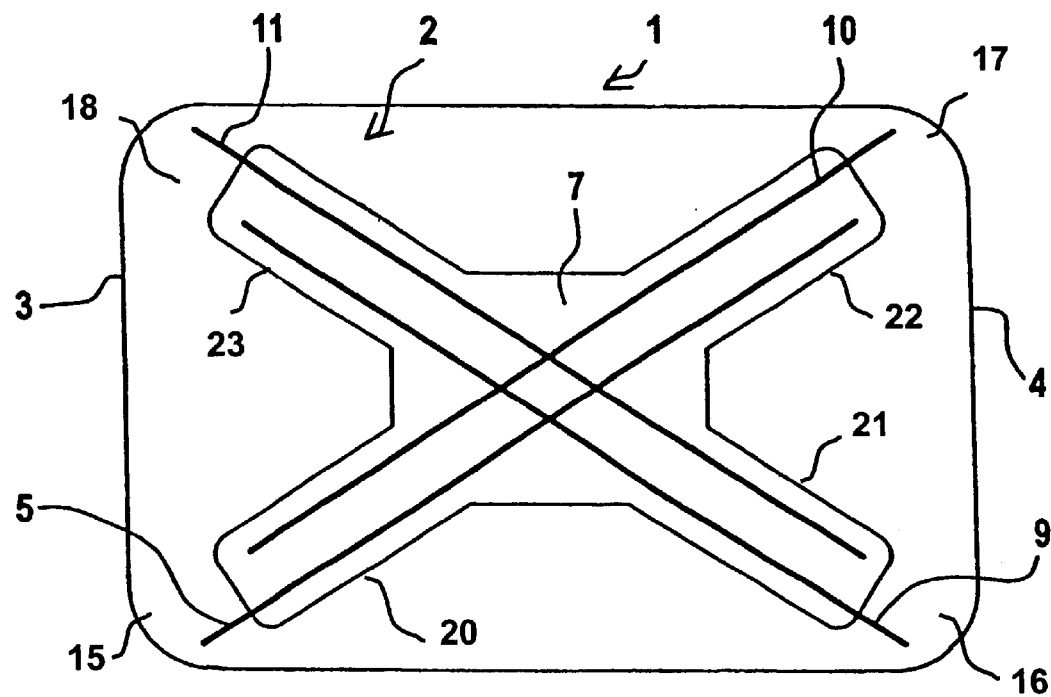
FIG. 3 shows the plan view of another embodiment of a ventilation device having four ventilation lines.

FIG. 3 shows an embodiment of the ventilation device in a fuel tank 1, wherein the ventilation device includes a compensator reservoir 2 having four subarms, a first subarm 20, a second subarm 21, a third subarm 22 and a fourth subarm 23. Each subarm extends into one of the areas. The first subarm 20 extends into the first area 15, the second subarm 16 extends into the second area 16, the third subarm 22 extends into the third area 17, and the fourth subarm 23 extends into the fourth area 18. The ventilation lines each run diagonally from an area (the "originating area"), through the subarm extends into that area (the "originating subarm") and the subarm extends into the area located diagonally from the area from which the ventilation line originated (the "opposing subarm"), terminating within the opposing subarm so that that ventilation line's second opening is located within the compensator reservoir 2. For example, in the embodiment shown in FIG. 3, the first ventilation line 5 begins in area 15 and runs through subarm 20 and then through subarm 22 so that the first ventilation line 5 terminates in subarm 22. The second ventilation line 9 begins in area 16 and runs through subarm 21 and then through subarm 23 so that the second ventilation line 9 terminates in subarm 23. The third ventilation line 10 begins in area 17 and runs through subarm 22 and then through subarm 20 so that the third ventilation line 10 terminates in subarm 20. The fourth ventilation line 11 begins in area 18 and runs through subarm 23 and then through subarm 21 so that the fourth ventilation line 11 terminates in subarm 21.

We claim:

1. A ventilation device for a fuel tank, wherein the fuel tank comprises a first side wall, a second side wall and an interior, comprising:
    a compensator reservoir in the interior of the fuel tank; and
    at least two ventilation lines, wherein the at least two ventilation lines run from approximately the first side wall or the second side wall, respectively, to approximately the second side wall or the first side wall, respectively, and at least a first portion of each of the at least two ventilation lines is located within the tank but outside of the compensator reservoir and a second portion of each of the at least two ventilation lines extends within the compensator reservoir.

2. The ventilation device as claimed in claim 1, wherein each of the at least two ventilation lines comprise a first opening and a second opening.

3. The ventilation device as claimed in claim 2, wherein the first opening opens into the interior of the fuel tank and the second opening opens into the compensator reservoir.

4. The ventilation device as claimed in claim 1, wherein the at least two ventilation lines enter into the compensator reservoir at one location.

5. The ventilation device as claimed in claim 1, wherein the compensator reservoir comprises a center and the at least two ventilation lines enter into the center of the compensator reservoir.

6. The ventilation device as claimed in claim 1, wherein the at least two ventilation lines enter into the compensator reservoir at different locations.

7. The ventilation device as claimed in claim 1, wherein the at least two ventilation lines are predominantly diagonal.

8. The ventilation device as claimed in claim 1, wherein the compensator reservoir comprises a widened section connected to the interior of the fuel tank.

9. The ventilation device as claimed in claim 8, wherein the widened section is connected to the interior of the fuel tank via an ejector and/or a valve.

10. The ventilation device as claimed in claim 8, wherein the widened section is connected to the interior of the fuel tank via a fuel pump.

11. The ventilation device as claimed in claim 1, wherein the fuel tank further comprises a fuel level and may assume a plurality of inclined positions, wherein the at least two ventilation lines each comprise a first opening and are arranged in such a manner that at least either one of the first openings of the ventilation lines is situated above the fuel level for all the plurality of inclined positions of the fuel tank.

12. A ventilation device for a fuel tank, wherein the fuel tank includes at least four areas and at least two opposing side walls, comprising:
    a compensator reservoir in the interior of the fuel tank; and
    at least four ventilation lines, wherein each of the at least four ventilation lines run from one of the at least four areas toward the compensator reservoir, wherein each of the at least four ventilation lines enter the compensator reservoir and are guided toward one of the opposing side walls.

13. A ventilation device as claimed in claim 12, wherein the compensator reservoir comprises a widened section and wherein the at least four ventilation lines enter the compensator reservoir at the widened section.

14. A ventilation device for a fuel tank, wherein the fuel tank comprises at least four areas, wherein each of the at least four areas may be an originating area, comprising:

a compensator reservoir, wherein the compensator reservoir comprises at least four subarms, wherein each of the at least four subarms may be an originating subarm and/or an opposing subarm; and at least four ventilation lines, wherein each of the at least four ventilation lines run from one of the originating areas, through one of the originating subarms and one of the opposing subarms.

15. A ventilation device as claimed in claim 14, wherein the at least four ventilation lines each include a second opening which is located within one of the at least four opposing subarm.

16. A ventilation device for a fuel tank, wherein the fuel tank comprises a first side wall, a second side wall and an interior, comprising:

a compensator reservoir in the interior of the fuel tank; and at least two ventilation lines, wherein the at least two ventilation lines run from approximately the first side wall or the second side wall, respectively, to approximately the second side wall or the first side wall, respectively, with a first portion of each line inside the tank but outside the compensator reservoir and a second portion of each line within the compensator reservoir, and wherein the at least two ventilation lines enter into the compensator reservoir at one location.

17. The ventilation device as claimed in claim 16, wherein each of the at least two ventilation lines comprise a first opening and a second opening.

18. The ventilation device as claimed in claim 17, wherein the first opening opens into the interior of the fuel tank and the second opening opens into the compensator reservoir.

19. The ventilation device as claimed in claim 16, wherein the compensator reservoir comprises a center and the at least two ventilation lines enter into the center of the compensator reservoir.

* * * * *